US011126617B2

(12) United States Patent
Chen (10) Patent No.: US 11,126,617 B2
(45) Date of Patent: Sep. 21, 2021

(54) APPARATUS AND METHOD FOR DETERMINING A FINALITY OF A BLOCK WITHIN A BLOCKCHAIN

(71) Applicant: MOAC BLOCKCHAIN TECH INC, Palo Alto, CA (US)

(72) Inventor: Xiaohu Chen, Mountain View, CA (US)

(73) Assignee: MOAC BLOCKCHAIN TECH, INC., Palo Alto, CA (US)

(*) Notice: Subject to any disclaimer, the term of this patent is extended or adjusted under 35 U.S.C. 154(b) by 209 days.

(21) Appl. No.: 16/518,073

(22) Filed: Jul. 22, 2019

(65) Prior Publication Data

US 2021/0026840 A1     Jan. 28, 2021

(51) Int. Cl.
*G06F 16/23*     (2019.01)
*G06F 16/2458*     (2019.01)

(52) U.S. Cl.
CPC ...... *G06F 16/2379* (2019.01); *G06F 16/2365* (2019.01); *G06F 16/2465* (2019.01); *G06F 2216/03* (2013.01)

(58) Field of Classification Search
CPC ............. G06F 16/2379; G06F 16/2365; G06F 16/2465; G06F 2216/03
See application file for complete search history.

(56) References Cited

U.S. PATENT DOCUMENTS

2017/0091756 A1*   3/2017   Stern ................... G06Q 20/367
2019/0199787 A1*   6/2019   Carver ................. H04L 67/108

OTHER PUBLICATIONS

Sayeed, Assessing Blockchain Consensus and Security Mechanisms against the 51% Attack, 14 pages, (Jan. 2019).*
Conti et al., "A Survey on Security and Privacy Issues of Bitcoin," Dec. 25, 2017, 36 pages.
Eyal et al., "Majority is not Enough: Bitcoin Mining is Vulnerable," Department of Computer Science, Cornell University, [no date], 18 pages.
Zheng et al., "Blockchain challenges and opportunities: a survey," https://www.researchgate.net/publication/328271018, Article in International Journal of Web and Grid Services, Oct. 2018, 25 pages.

* cited by examiner

*Primary Examiner* — Albert M Phillips, III (57) ABSTRACT

A processing node receives a finality proposal for a subject block within a blockchain. The finality proposal including an identifier of the subject block and one or more measures, wherein each of the one or more measures is based on the number of blocks within the blockchain that were mined by a respective node within the network of nodes other than the processing node. The processing node determines the subject block is a finalized block when a value based on the one or more measures satisfies a finality criterion. When the value fails to satisfy the finality criterion, the processing node transmits a subsequent finality proposal for the subject block. The subsequent finality proposal includes the identifier of the subject block, the one or more measures from the finality proposal, and an additional measure based on the number of blocks within the blockchain that were mined by the processing node.

17 Claims, 7 Drawing Sheets

APPARATUS AND METHOD FOR DETERMINING A FINALITY OF A BLOCK WITHIN A BLOCKCHAIN

TECHNICAL FIELD

The present disclosure relates generally to blockchains, and more particularly, to apparatuses and methods that determine a finality of a block within a blockchain.

BACKGROUND

Blockchain is a distributed data processing protocol for retaining a public distributed ledger in a Peer-to-peer (P2P) network. Transaction data is recorded in blocks, and these blocks form a linked list (i.e., chain) of blocks. Each node in the network stores and maintains an entire copy of the ledger without requiring a central authority. In blockchain-based cryptocurrencies, each block contains the hash value of the previous block, making it hard to manipulate the transactions within. Normally, a consensus protocol is used to guarantee the data integrity among the nodes of the blockchain P2P network. There are several different consensus protocols used in different types of blockchains. See, e.g., Z. Zheng, S. Xie, H. Dai, X. Chen, and H. Wang, "Blockchain challenges and opportunities: A survey," Int. J. Web Grid Serv., 2016.

Proof-of-Work (PoW) is the most commonly used consensus protocol in blockchain-based cryptocurrencies. In the PoW protocol, each peer node is competing to find a nonce value to produce a hash that meets a certain criteria. A nonce (number only used once) value is a number added to a hashed block that, when rehashed, meets the difficulty level restrictions. The nonce value is the number that the peer nodes are solving for. The difficulty of calculating such a nonce value can be calculated based on the criteria of the hash value. When such a nonce value is found, a block is generated and broadcasted to the P2P network. Depending on different varieties of the PoW protocol, peer nodes always accept the longest chain or the chain with the largest total difficulty repeatedly to continuously expand the blockchain. PoW utilizes this mechanism to determine which node has the right to seal a block. This process is also called mining and the peer nodes are called mining nodes or miners.

In PoW blockchain systems, a peer node with greater computing speed (or sometimes called hash rate power) can calculate a nonce value faster than a peer node with less computing speed and thus has a higher probability of getting the right to seal a new block. This mechanism, however, has a drawback. A selfish peer node with a hash rate power higher than those of the rest of the peer nodes combined can compromise the blockchain system by causing double spending and selfish mining, etc. See e.g., M. Conti, S. Kumar E, C. Lal, and S. Ruj, "A survey on security and privacy issues of Bitcoin," arXiv preprint arXiv: 1706.00916, 2017, and Eyal, I. and Sirer, E. G. (2014) "Majority is not enough: Bitcoin mining is vulnerable", Proceedings of International Conference on Financial Cryptography and Data Security, Berlin, Heidelberg, pp. 436-454. This is commonly referred to as a 51% attack, and can result in a split blockchain having a legitimate branch and a malicious branch. 51% attacks also threaten the health of a blockchain system by allowing the possibility for blocks to be revoked.

When users transact on a blockchain they want to be confident that once a block containing a transaction is generated, the block and its transactions cannot be arbitrarily changed or revoked. As such, in designing a blockchain consensus protocol, finality becomes vital. Finality is the affirmation that a block will not be revoked once the block is committed to the blockchain.

Most PoW blockchain systems only offer probabilistic finality. Probabilistic finality refers to the type of finality provided by chain-based protocols, in which the probability that a transaction will not be reverted increases as the block which contains that transaction sinks deeper into the chain. The deeper the block, the more likely that the branch containing that block is the longest chain. For example, it is recommended to wait until a transaction is 6 blocks deep into the Bitcoin blockchain, which takes around an hour, before following through on that transaction, to ensure that there is a very low likelihood of that transaction being reverted.

Other blockchain systems offer absolute finality. Absolute finality refers to the type of finality provided by practical byzantine fault tolerance (PBFT)-like protocols, in which a transaction is immediately considered finalized once it is included in a block and added to the blockchain. In this case, a leader will propose a block, and a sufficient fraction of a committee of validators will have to approve the block for it be committed. However, a PBFT-like protocol requires the committee size to be small, as the voting process requires $o(n^2)$ messages complexity. If the member size is big (e.g. >50), the message exchange will saturate the communication channel. The rotation of the committee leader is called view change. A typical view change requires even more message communication packets. With threshold signature, the leader could be selected randomly with less communication overhead. Also, the committee member of PBFT-like protocol are normally enrolled in a permissioned manner, to limit the risk of smaller committee member size. The change of committee is possible, but requires a lot of management overhead, and in a very in-frequent manner.

Additional schemes to determine the finality of a block in a blockchain are desirable. The concepts disclosed below address this need and others. For example, in accordance with the scheme disclosed herein, absolute finality is added into PoW system. Compared to PBFT-like protocols, this approach does not require any additional message complexity, thus retaining the good features of PoW ($o(n)$ message complexity). It also does not compromise the permissionless feature of PoW protocol. A miner of the protocol disclosed herein can join/leave the system dynamically. The disclosed protocol also supports a large number of nodes, which is not possible in a PBFT-like protocols.

SUMMARY

A node or a group of nodes in a network implement a method or mechanism for determining a finality of a subject block within a blockchain mined by the network of nodes. The mechanism is based on historical measures, e.g., mining weights, that are derived for each node that has mined a block in the blockchain. Agreement on the finality of a subject block in the blockchain is reached when the summation of the mining weights of nodes that have processed a finality request on the subject block satisfies a criterion.

From the perspective of a single node in the network, the finality of a subject block in the blockchain is determined as follows. The single node, referred to herein as a processing node, receives a finality proposal for the subject block. The finality proposal includes an identifier of the subject block and one or more measures, wherein each of the one or more measures is based on the number of blocks within the blockchain that were mined by a respective node within the network of nodes other than the processing node. The processing node determines the subject block is a finalized block when a value, e.g., summation, based on the one or more measures satisfies a finality criterion. When the value fails to satisfy the finality criterion, the processing node transmits a subsequent finality proposal for the subject block. The subsequent finality proposal includes the identifier of the subject block, the one or more measures from the finality proposal, and an additional measure based on the number of blocks within the blockchain that were mined by the processing node. The subsequent finality proposal is then processed by another node in the network.

From the perspective of a group of nodes in the network, the finality of a subject block in the blockchain is determined as follows. A first node in the network of nodes initiates an initial finality proposal on a subject block of the blockchain. The initial finality proposal includes an identifier of the first block and a measure based on the number of blocks within the blockchain that were mined by the first node. A second node in the network receives the initial finality proposal and validates the initial finality proposal. The second node then processes the initial finality proposal. To this end, the second node determines the subject block is a finalized block when a value based on the measure included in the initial finality proposal satisfies a finality criterion. If the criterion is not satisfied, the second node transmits a subsequent finality proposal for the subject block. The subsequent finality proposal includes the identifier of the subject block, the measure from the initial finality proposal, and an additional measure based on the number of blocks within the blockchain that were mined by the second node. Another node in the network then processes the subsequent finality proposal in the same way the second node processed the initial finality proposal. The foregoing processing repeats until the finality criterion is satisfied and the subject block is finalized.

It is understood that other aspects of methods, apparatuses and mechanisms, will become readily apparent to those skilled in the art from the following detailed description, wherein various aspects are shown and described by way of illustration.

BRIEF DESCRIPTION OF THE DRAWINGS

Various aspects of methods, apparatuses and mechanisms will now be presented in the detailed description by way of example, and not by way of limitation, with reference to the accompanying drawings, wherein.

DETAILED DESCRIPTION

Figure 1:
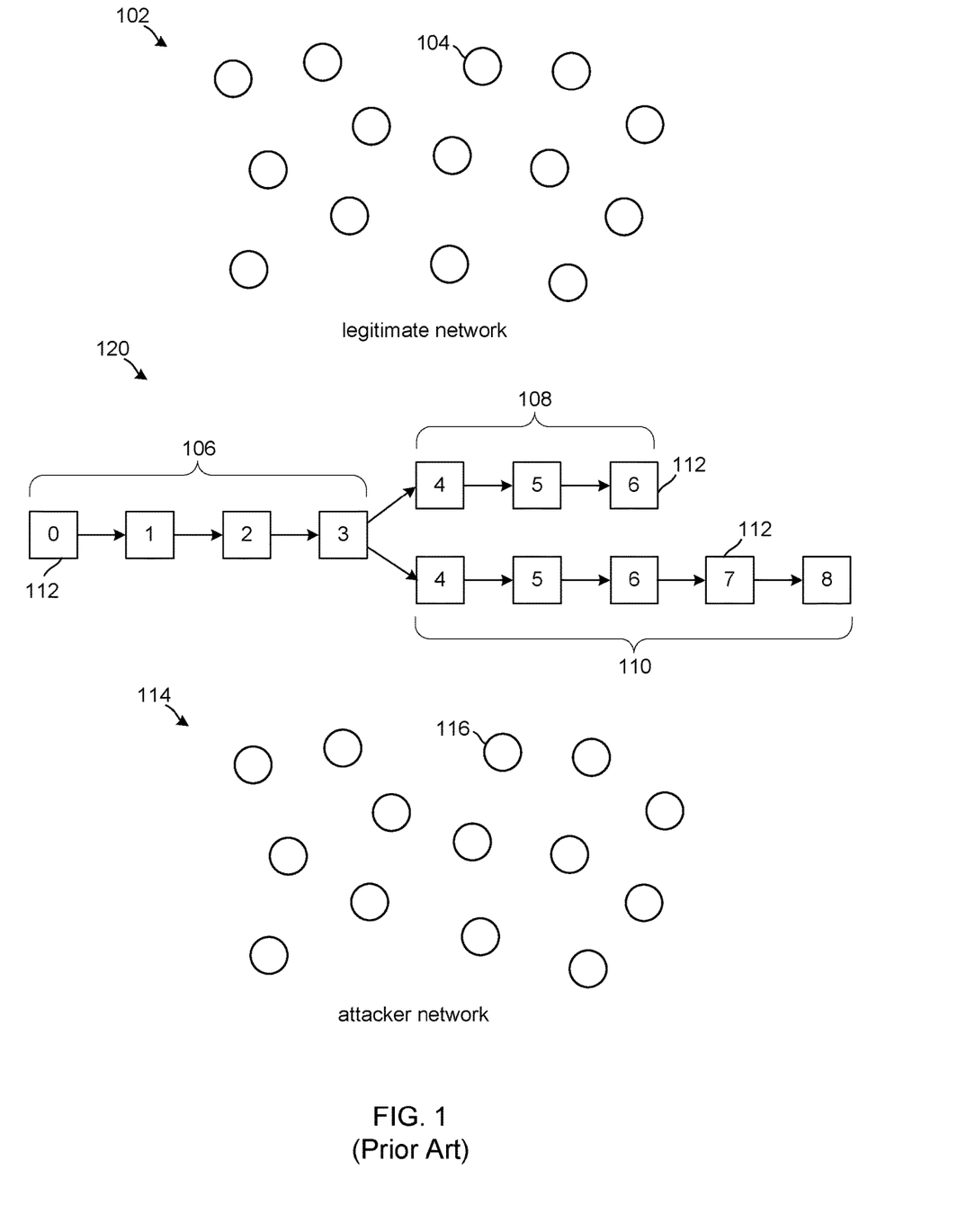
FIG. 1 is an illustration of a split blockchain including a legitimate branch and a malicious branch together with illustrations of a legitimate network of mining nodes and an attacker network of mining nodes that successfully conducts a 51% attack.

With reference to FIG. 1, an original blockchain 106 may split into a legitimate branch 108, which is essentially a continuation of the original blockchain, and a malicious branch 110, thus forming a split block chain 120. A first peer-to-peer network 102 of mining nodes 104, referred to herein as a legitimate network, is associated with the original blockchain 106 and the legitimate branch 108. The mining nodes 104 in the legitimate network 102 execute mining operations that lead to the addition of new blocks 112 to the original blockchain 106 and the legitimate branch 108.

A second peer-to-peer network 114 of mining nodes 116, referred to herein as an attacker network, is associated with the malicious branch 110. The mining nodes 116 in the attacker network 114 execute mining operations that lead to the addition of new blocks 112 to the malicious branch 110. One mechanism by which an attacker network 114 successfully creates a malicious branch 110 is the previously described 51% attack.

While the first peer-to-peer network 102 and the second peer-to-peer network 114 are illustrated as separate groups of nodes 104, 116, these nodes may be part of a large-scale, decentralized peer-to-peer network having a large number of distributed nodes. The number of nodes in the decentralized network may be, for example, around 10,000. While a large number of nodes may be present in a large-scale decentralized network, for ease of illustration, a reduced number of nodes are shown in FIG. 1.

Most proof-of-work (PoW) blockchain systems have a property called "longest chain of work," which helps determine consensus. When a node mines a block, it always looks to add the block to the longest chain. However, it is possible at any moment in time that there exists more than one chain. For example, as described with reference to FIG. 1, a chain can split into two different forks or branches when two different miners mine a block at the same time. At this moment the active main chain has split into two different forks and it is quite difficult to determine which fork is the valid chain.

In this scenario, both forks will continue to validate blocks and add new blocks. Once one of the chains validates a block before the other chain completes, the chain that validated first becomes the longest chain. The longest chain is the one with the longest most valid blocks attached. The longest chain officially becomes the accepted chain and the transactions mined on the shorter chain are rejected. However, it is possible the transactions rejected on the shorter chain have been included in other blocks on the longest chain.

As mentioned above, a split blockchain having a legitimate branch and a malicious branch may result from a 51% attack. Such an attack also threatens the health of a blockchain system by allowing the possibility for blocks to be revoked, thus rendering the finality of blocks indefinite. Disclosed in detail below is a mechanism that determines an absolute finality of a block in a blockchain, including split blockchains resulting from 51% attacks and other selfish mining schemes.

Figure 2A:
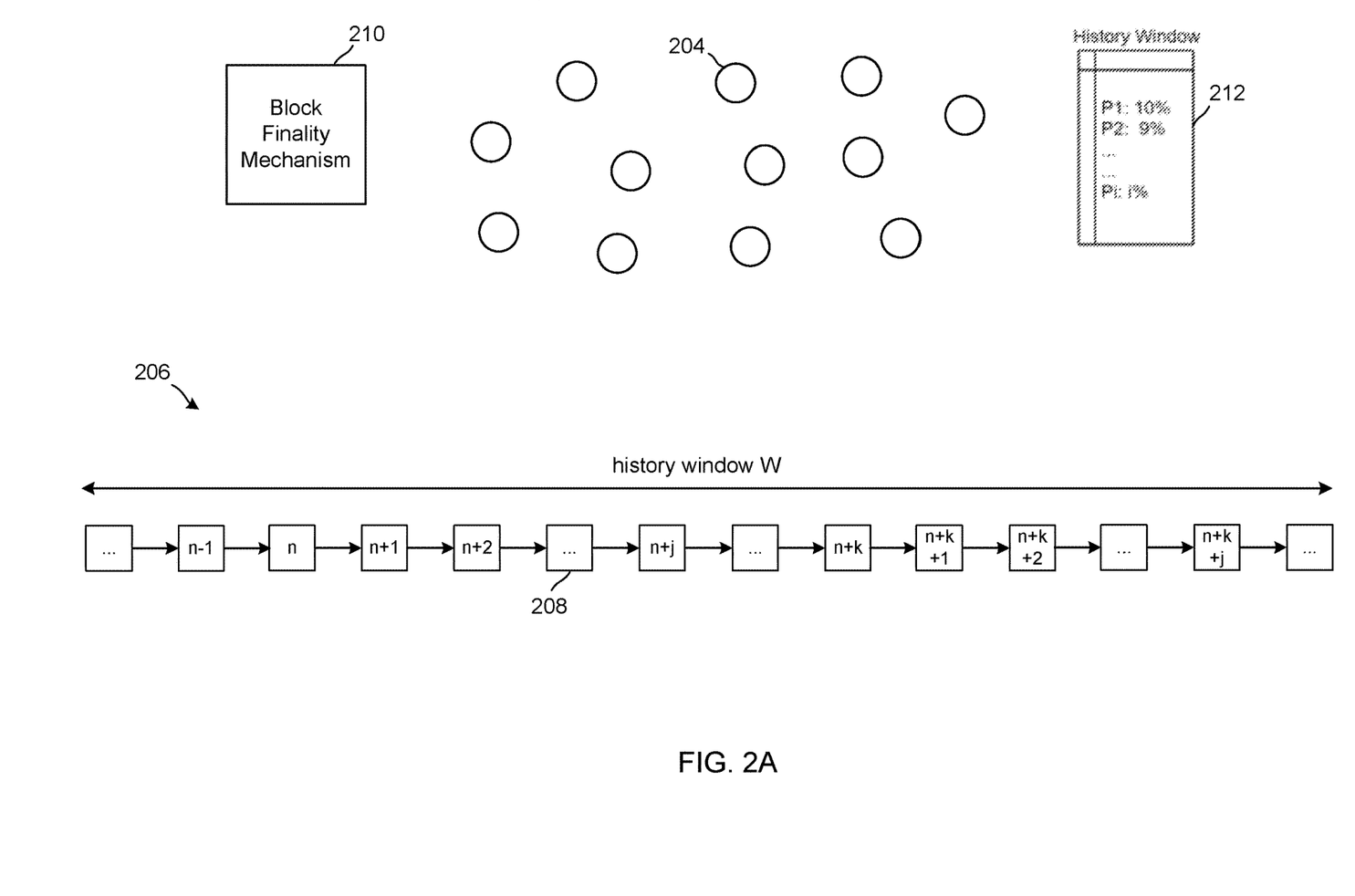
FIGS. 2A and 2B are illustrations of a network of nodes operating in accordance with a block finality mechanism to determine a finality of blocks in a blockchain.

With reference to FIG. 2A, a network 202 of nodes includes a number of mining nodes 204 that have minded for a blockchain 206. The blockchain 206 shown in FIG. 2A may comprise, for example, an original blockchain 106 and either of a set of branches 108, 110 as illustrated in FIG. 1. The mining nodes 204 in the network 202 execute mining operations that lead to the generation and addition of new blocks 208 to the blockchain 206. The mining nodes 204 in the network 202 also operate in accordance with a block finality mechanism 210 that determines the finality of blocks 208 in the blockchain 206 based on measures of block generation. The block finality mechanism 210 may also be referred to herein as a block finality protocol or a block finality scheme.

With continued reference to FIG. 2A, as part of the block finality protocol, a measure or weight of block generation for a history window W of the blockchain 206 is calculated for each node 204, i.e., miner, that has generated or minded a block 208 in the blockchain. In order to properly associate a block 208 with a node 204 that generated that block, each block in the blockchain 206 has an associated signature corresponding to a hash that is derivable from the private key of the node that mined that block.

The measures or weights $p_i$ of block generation are calculated locally at each node 204 in the network 202, as follows:

$$p_i = \frac{\text{(number of blocks mined by node } i)}{\text{(total number of blocks mined in window } W)}$$

where, node i=a respective node 204 in the network 202 of nodes,

W=all or a portion of the blockchain 206 defined by a number of blocks 208 in the blockchain; in an example, the window W may be 2,000,000 blocks.

Having calculated a weight $p_i$ for a window W for each node 204 in the network 202 of nodes, each respective node maintains a record 212 of weights for the network of nodes. The weights $p_i$ for a window W within a record 212 satisfy the following equation:

$$\sum_{i=1}^{n} p_i = 1$$

where, n=the total number of nodes 204 in the network 202 of nodes that have mined for the blockchain 206.

The weights $p_i$ and corresponding record 212 of weights are recalculated and updated each time a new block 208 is added to the blockchain 206. Accordingly, the window W over which weights $p_i$ are calculated is in essence a sliding window that ends with the last block 208 in the blockchain 206 and begins W blocks before the last block. Alternatively, the window may be an expanding window that has a fixed beginning block and expands to encompass each new block 208 appended to the blockchain 206.

Figure 2B:
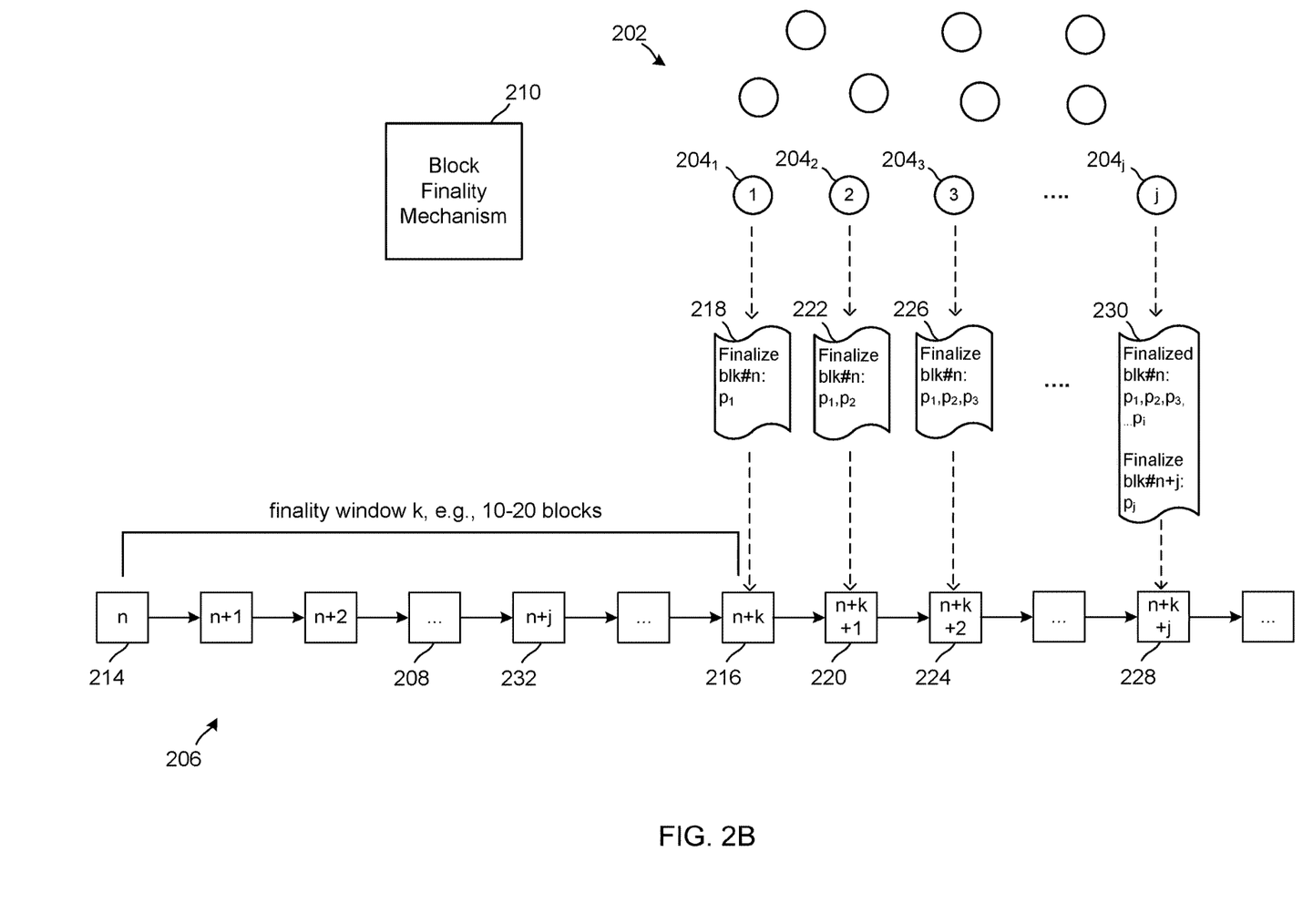

With reference to FIG. 2B, as part of the block finality protocol, a finality proposal for a block 208 in the blockchain 206 is initiated in accordance with a finality window k. The finality window k corresponds to a number of blocks 208 and defines a block in a blockchain at which a finality proposal may be initiated. Thus, a finality proposal for a block n is not initiated until block n+k. In one example, the finality window k is between 10 and 20 blocks. However, because the finality protocol is an ongoing process, the initial number k is not important. The block length between start block 216 and end block 228 requires 50% vote, so it typically requires between 10 and 20 blocks to reach 50% vote, depending on how mining powers is decentralized.

Continuing with FIG. 2B, a first node $204_1$ in the network 202 proposes a finality on block n 214 of the blockchain 206. The timing of the proposal is in accordance with the finality window k. Thus, the node that generates block n+k 216, e.g., the first node $204_1$, may include a finality proposal to initiate a finality request on block n 214 in the transaction record 218 associated with the block n+k. In addition to the finality proposal, the transaction record 218 may include one or more records of blockchain transactions, events, or data. The finality proposal includes a finality request and the weight $p_1$ of the first node $204_1$, as follows:

finalized_blk #n: $p_1$.

The block n+k 216 is broadcasted into the network 202 of nodes 204. Thus, each node 204 in the network receives the block n+k 216 and its associated transaction record 218. The other nodes 204 in the network 202 verify the validity of the transaction record 218 of block n+k 216, including the finality proposal. To this end, the other nodes 204 may consider a transaction record valid 218 by the mere fact that the blockchain 206 has progressed to the next block, e.g., block n+k+1 220. If the block n+k 216 transaction record 218 are invalid, the finality request on block n 214 is terminated. If the block n+k 216 transaction record 218 are valid, the finality request on block n 214 continues.

To this end, the node that generates block n+k+1 220, e.g., the second node $204_2$, may include a finality proposal in the transaction record 222 associated with the block n+k+1. In addition to the finality proposal, the transaction record 222 may include one or more records of blockchain transactions, events, or data. The finality proposal includes the same finality request on block n 214 and the weight $p_1$ included in the transaction record 218 of the first node $204_1$ together with the weight $p_2$ of the second node $204_2$, as follows:

finalized_blk #n: $p_1+p_2$.

The block n+k+1 220 is broadcasted into the network 202 of nodes 204. Thus, each node 204 in the network receives the block n+k+1 220 and its associated transaction record 222. The other nodes 204 in the network 202 verify the validity of the transaction record 222 of block n+k+1 220, including the finality proposal. If the block n+k 220 transaction record 222 are invalid, the finality request on block n 214 is terminated. If the block n+k 220 transaction record 222 are valid, the finality request on block n 214 continues.

The finality request on block n 214 is continued in accordance with the foregoing process by other nodes 204 in the network 202 until the total sum of the weights $p_i$ included in a current transaction record satisfies a criterion. The total sum of the weights may be represented as follows:

$$\sum_{i=1}^{m} p_i$$

where,

=a random number, e.g., 10, 20, or another number

And the criterion may be:

$$\sum_{i=1}^{m} p_i > 50\%$$

For example, continuing with FIG. 2B, the node that generates block n+k+2 224, e.g., the third node $204_3$, may determine that $p_1+p_2$ included in the transaction record 222 associated with block n+k+1 220 does not satisfy the criterion and may continue the finality proposal on block n 214. To this end, the third node $204_3$ may include a finality proposal in the transaction record 226 associated with the block n+k+2. In addition to the finality proposal, the transaction record 226 may include one or more records of blockchain transactions, events, or data. The finality proposal includes the same finality request on block n 214 and the weight $p_1$ and $p_2$ included in the transaction record 222 together with the weight $p_3$ of the third node $204_3$, as follows:

finalized_blk #n: $p_1+p_2+p_3$.

Eventually, the node that generates block n+k+j 228, e.g., the last node $204_j$, may determine that the cumulative weight $p_1+p_2+p_3 \ldots +p_m$ present in the immediately prior finality proposal included in the transaction record associated with the block preceding the block 228 does satisfy the criterion. In this case, the last node $204_j$ finalizes the finality proposal on block n 214 by including in the transaction record 230 associated with the block 228, an indication of the finalization of block n together with the final cumulative weight $p_1+p_2+p_3 \ldots +p_m$, and broadcasting the transaction record 230 into the network 202 of nodes 204.

The last node $204_j$ may also proposes a finality on block n+j 232 of the blockchain 206. The occurrence of this proposal depends on the finalization of the finality proposal of block n 214. In other words, two finality proposals may not run concurrently. The timing of the proposal is in accordance with the finality window k. Thus, the last node $204_j$ selects a node for finality that precedes it by k blocks. In this case, the last node $204_j$ may include a finality proposal to initiate a finality request on block n=j 232 in the transaction record 230 associated with the block n+k+j. In addition to the finality proposal, the transaction record 230 may include one or more records of blockchain transactions, events, or data. The finality proposal includes a finality request and the weight $p_j$ of the last node $204_j$, as follows:

finalized_blk #n: $p_j$.

In the foregoing description it is assumed that each respective block 216, 220, 224, 228 is generated by a different node 204 in the network 202 of nodes. This is not necessarily the case, as a single node 206 may generate more than one block. When this occurs, the weight $p_i$ of the node that generated multiple blocks is only counted once in the cumulative weight $p_1+p_2+p_3 \ldots +p_m$.

Figure 3:
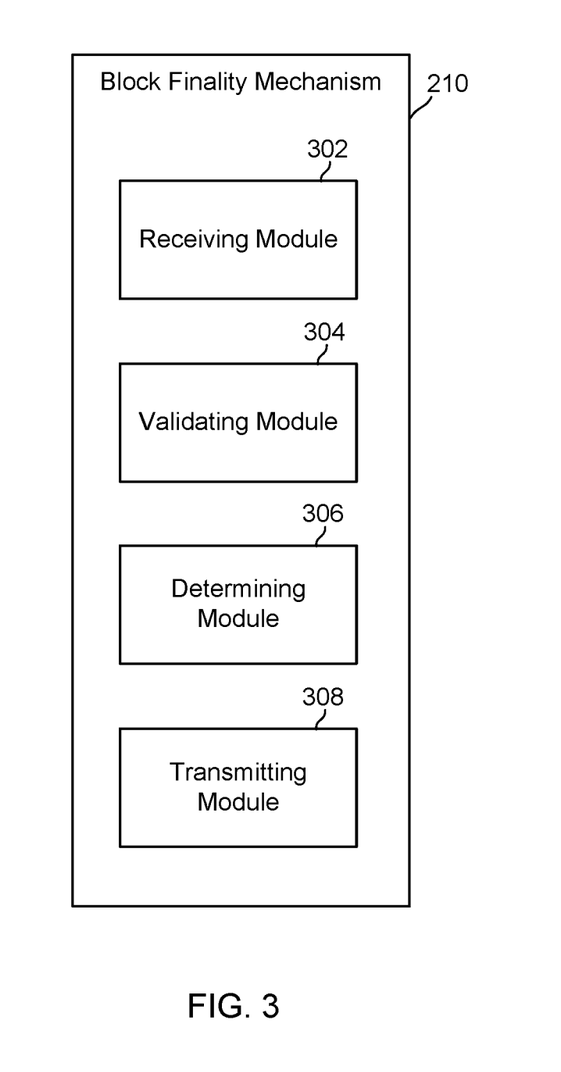
FIG. 3 is a block diagram of the block finality mechanism of FIGS. 2A and 2B.

With reference to FIG. 3, the block finality mechanism 210 may be implemented in a processing node and involves four functional modules, including a receiving module 302, a validating module 304, a determining module 306, and a transmitting module 308. While the processing node may correspond to any one of the plurality of nodes 204 in a network 202 of nodes, in the description below the processing node is selected to correspond to the node $204_3$.

The receiving module 302 is configured to receive a finality proposal for a subject block 214. The finality proposal may be part of a transaction record 222 and includes an identifier of the subject block 214 and one or more measures $p_1$, $p_2$ wherein each of the one or more measures is based on the number of blocks 208 within a blockchain 206 that were mined by a respective node $204_1$, $204_2$ within the network 202 of nodes other than the processing node $204_3$.

The validating module 304 is configured to validate the finality proposal prior to executing further processing of the proposal. The finality proposal may be validated in accordance with a consensus protocol used to validate blockchain transactions.

The determining module 306 is configured to determine the subject block 214 is a finalized block when a value based on the one or more measures $p_1$, $p_2$ satisfies a finality criterion.

The transmitting module 308 is configured to transmit a subsequent finality proposal for the subject block 214 when the value fails to satisfy the finality criterion. The subsequent finality proposal includes the identifier of the subject block 214, the one or more measures $p_1$, $p_2$ from the finality proposal, and an additional measure $p_3$ based on the number of blocks within the blockchain 206 that were mined by the processing node $204_3$.

Figure 4:
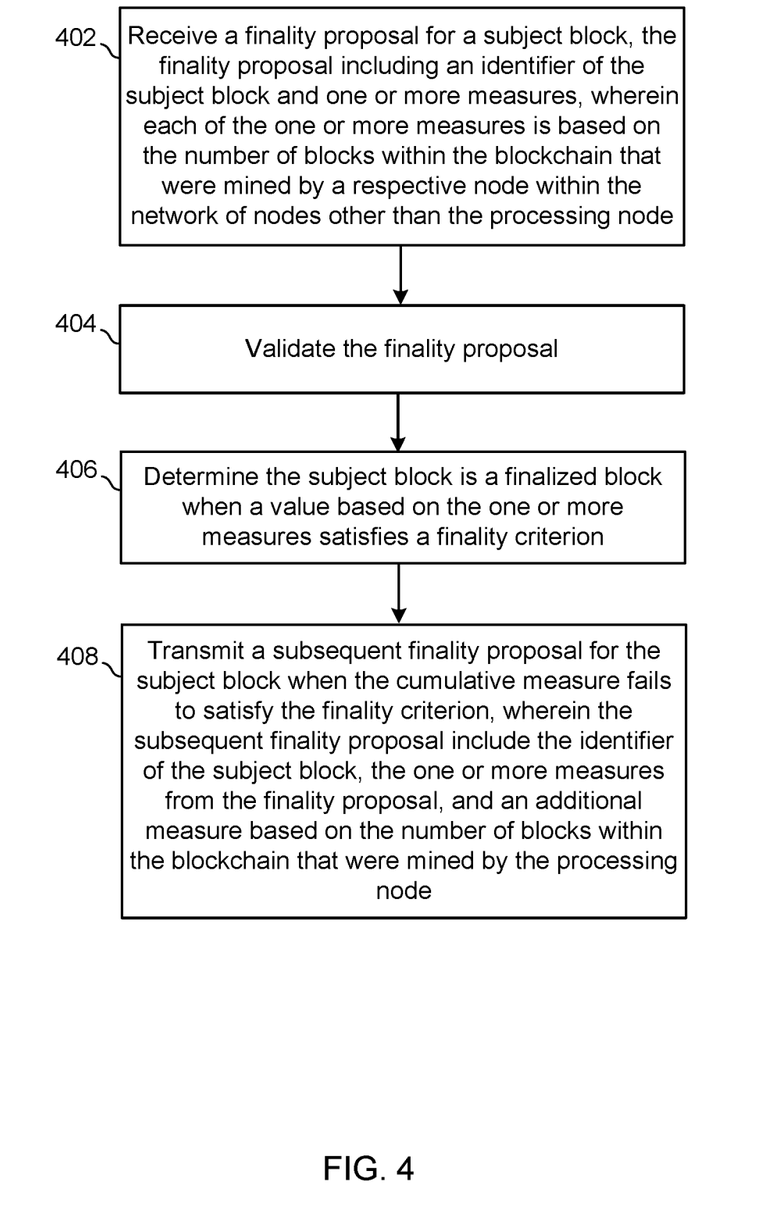
FIG. 4 is a flowchart of a method of determining a finality of a block in a blockchain from the perspective of a single node in a network of nodes.

FIG. 4 is a flowchart of a method of determining a finality of a subject block within a blockchain mined by a network of nodes. The method may be performed, for example, by one or more nodes 204 of a decentralized network 202 of nodes, where each node is configured to implement a block finality mechanism 210 like the one described above with reference to FIG. 3. The node 204 implementing the method of FIG. 4 is referred to below as a processing node.

At block 402, and with additional reference to FIG. 2B, a processing node $204_3$ receives a finality proposal for a subject block 214. The finality proposal is received from one of the other respective nodes 204 within the network 202 of nodes via the blockchain 206. For example, the finality proposal may be in a transaction record 222 that was generated by another node $204_2$ in the network 202 and appended to a block 220 of the blockchain 206. The finality proposal is received by the processing node $204_3$ during a processing of a block 220 in the blockchain 206 that is subsequent to the subject block 214 by at least a finality window k. The finality window k corresponds to a number of blocks 208 of the blockchain 206, and may be for example, in the range of 10 to 20 blocks.

The finality proposal includes an identifier of the subject block blk #n and one or more measures $p_1$, $p_2$. Each of the one or more measures $p_1$, $p_2$ is based on the number of blocks 208 within the blockchain 206 that were mined by a respective node 204 within the network 202 of nodes other than the processing node $204_3$. A respective node 204, for which a measure is included in the finality proposal, corresponds to a node within the network 202 of nodes that has previously executed at least a portion of the method of FIG. 4. For example, with reference to FIG. 2B, the measures $p_1$ is based on the number of blocks 208 within the blockchain 206 that were mined by node $204_1$, which previously transmitted a finality proposal via transaction record 218 and block 216. The measures $p_2$ is based on the number of blocks 208 within the blockchain 206 that were mined by node $204_2$, which previously received a finality proposal via transaction record 218 and block 216, and transmitted a finality proposal via transaction record 222 and block 220.

In one embodiment, and with reference to FIG. 2A, each of the measures $p_1$, $p_2$ corresponds to a weight $p_i$ determined as follows:

$$p_i = \frac{\text{(number of blocks mined by node } i\text{)}}{\text{(total number of blocks mined in window } W\text{)}}$$

where, node i=a respective node $204_1$, $204_2$ or the processing node $204_3$, W=all or a portion of the blockchain 206 defined by the number of blocks in the blockchain.

At block 404, the processing node $204_3$ validates the finality proposal. To this end, the finality proposal may be included in a transaction record 222 and the finality proposal is validated in accordance with a consensus protocol. The transaction record 222 may also include a transaction for the blockchain, in which case the finality proposal is validated as part of the transaction validation process.

At block 406, the processing node $204_3$ determines the subject block is a finalized block when a value based on the one or more measures $p_1$, $p_2$ satisfies a finality criterion. In one embodiment, the processing node $204_3$ sums the weights $p_i$ included in the finality proposal to obtain the value, and the finality criterion corresponds to a threshold value. For example, the threshold value may be 50% or 0.5. The processing node $204_3$ compares the value to the threshold value and concludes that the criterion is satisfied when the value is equal to or greater than the threshold value.

At block 408, the processing node $204_3$ transmits a subsequent finality proposal for the subject block 214 when the value fails to satisfy the finality criterion. The subsequent finality proposal may be transmitted by including it in a transaction record 226 that is to be appended to a block 224 of the blockchain 206 by each of the other nodes 204 in the network 202. By doing so, the subsequent finality proposal is essentially broadcast to the other nodes in the network of nodes. The subsequent finality proposal includes the identifier of the subject block blk #n, the one or more measures from the finality proposal $p_1$, $p_2$, and an additional measure $p_3$ that is based on the number of blocks within the blockchain 206 that were mined by the processing node $204_3$.

Figure 5:
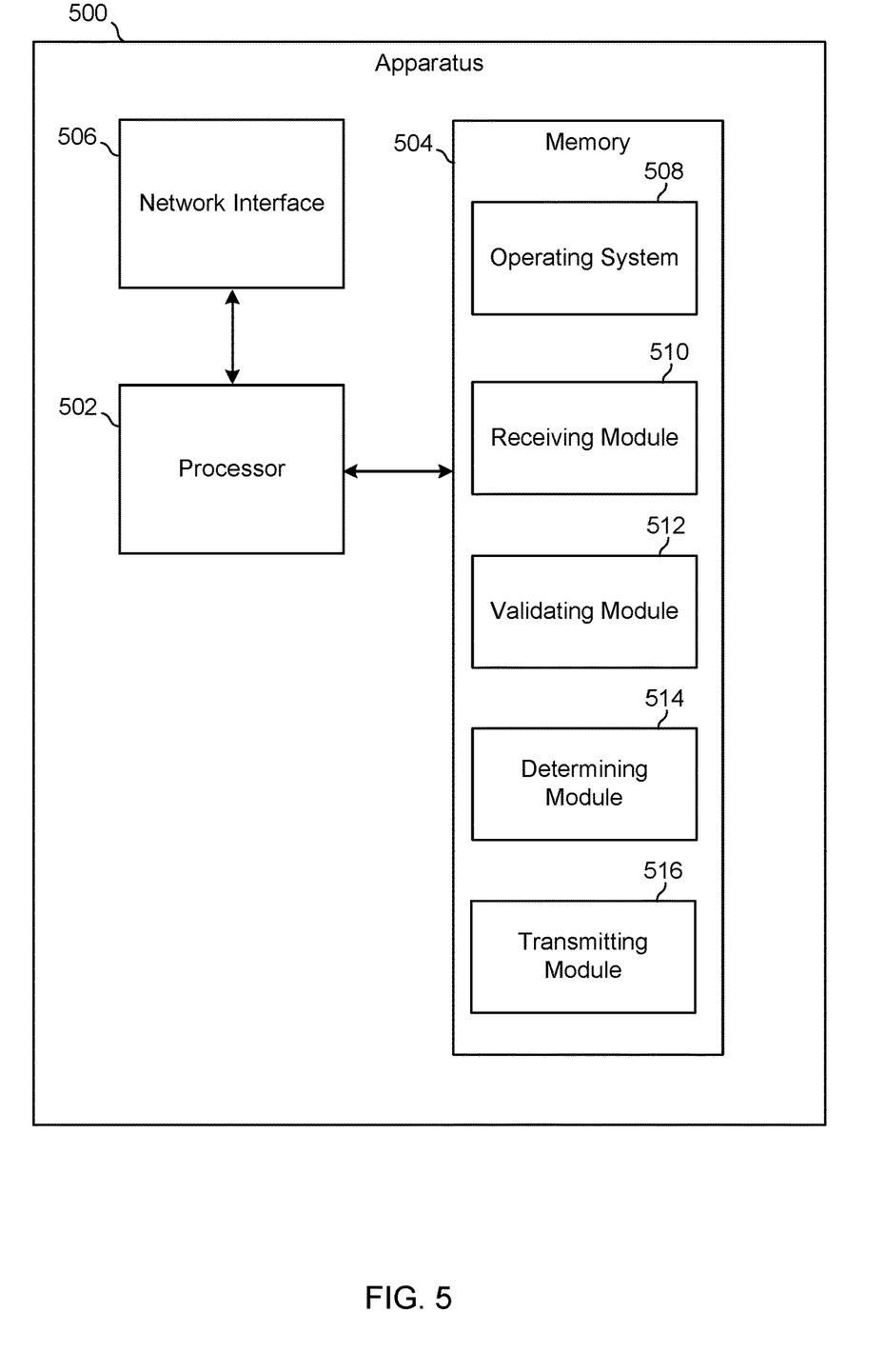
FIG. 5 is a block diagram of an apparatus configured to implement the method of FIG. 4.

FIG. 5 is a schematic block diagram of an apparatus 500. The apparatus 500 may correspond to one of the one or more nodes 204 of a decentralized network 202 of nodes, where each node is configured to implement a block finality mechanism, as described above with reference to FIGS. 2A, 2B, and 4.

The apparatus 500 may include one or more processors 502 configured to access and execute computer-executable instructions stored in at least one memory 504. The processor 502 may be implemented as appropriate in hardware, software, firmware, or combinations thereof. Software or firmware implementations of the processor 502 may include computer-executable or machine-executable instructions written in any suitable programming language to perform the various functions described herein. The processor 502 may include, without limitation, a central processing unit (CPU), a digital signal processor (DSP), a reduced instruction set computer (RISC) processor, a complex instruction set computer (CISC) processor, a microprocessor, a microcontroller, a field programmable gate array (FPGA), a System-on-a-Chip (SOC), or any combination thereof. The apparatus 500 may also include a chipset (not shown) for controlling communications between the processor 502 and one or more of the other components of the apparatus 500. The processor 502 may also include one or more application-specific integrated circuits (ASICs) or application-specific standard products (ASSPs) for handling specific data processing functions or tasks.

The memory 504 may include, but is not limited to, random access memory (RAM), flash RAM, magnetic media storage, optical media storage, and so forth. The memory 504 may include volatile memory configured to store information when supplied with power and/or non-volatile memory configured to store information even when not supplied with power. The memory 504 may store various program modules, application programs, and so forth that may include computer-executable instructions that upon execution by the processor 502 may cause various operations to be performed. The memory 504 may further store a variety of data manipulated and/or generated during execution of computer-executable instructions by the processor 502.

The apparatus 500 may further include one or more network interfaces 506 that may facilitate communication between the apparatus 500 and one or more other nodes using any suitable communications standard. For example, a LAN interface may implement protocols and/or algorithms that comply with various communication standards of the Institute of Electrical and Electronics Engineers (IEEE), such as IEEE 802.11, while a cellular network interface implement protocols and/or algorithms that comply with various communication standards of the Third Generation Partnership Project (3GPP) and 3GPP2, such as 3G and 4G (Long Term Evolution), and of the Next Generation Mobile Networks (NGMN) Alliance, such as 5G.

The memory 504 may store various program modules, application programs, and so forth that may include computer-executable instructions that upon execution by the processor 502 may cause various operations to be performed. For example, the memory 504 may include an operating system module (O/S) 508 that may be configured to manage hardware resources such as the network interface 506 and provide various services to applications executing on the apparatus 500.

The memory 504 stores additional program modules such as a receiving module 510, a validating module 512, a determining module 514, and a transmitting module 516, each of which includes functions in the form of logic and rules that respectively support and enable the receiving, validating, determining and transmitting functions described above with reference to FIGS. 2A, 2B, and 4. Although illustrated as separate modules in FIG. 5, one or more of the modules may be a part of or a submodule of another module.

The apparatus 500 and modules 510, 512, 514, 516 disclosed herein may be implemented in hardware or software that is executed on a hardware platform. The hardware or hardware platform may be a general purpose processor, a digital signal processor (DSP), an application specific integrated circuit (ASIC), a field programmable gate array (FPGA) or other programmable logic component, discrete gate or transistor logic, discrete hardware components, or any combination thereof, or any other suitable component designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP, or any other such configuration.

Figure 6:
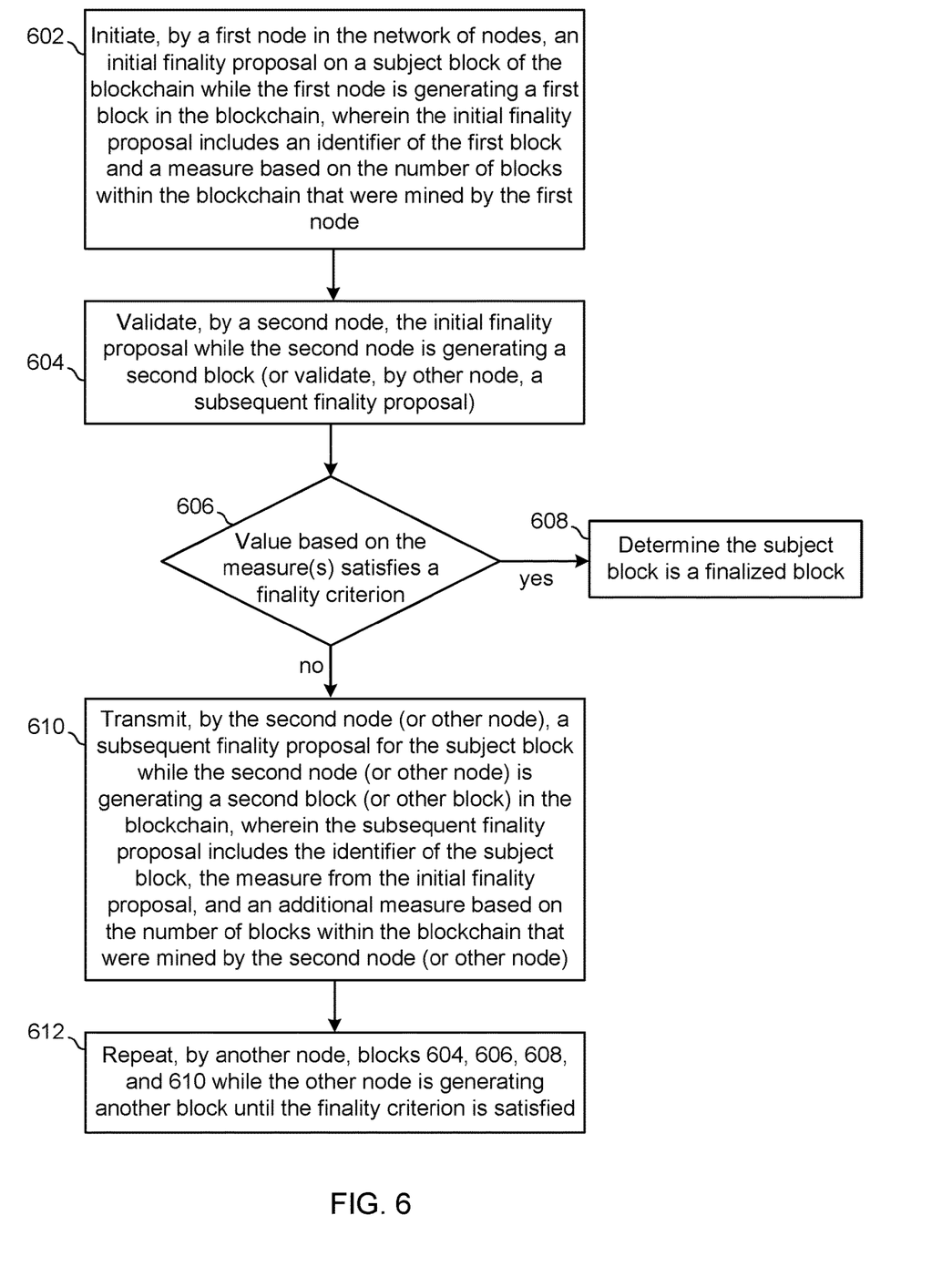
FIG. 6 is a flowchart of a method of determining a finality of a block in a blockchain from the perspective of a group of nodes in a network of nodes.

FIG. 6 is a flowchart of a method of determining a finality of a subject block within a blockchain mined by a network of nodes. The method may be performed, for example, by a group of nodes 204 of a decentralized network 202 of nodes, where each node is configured to implement a block finality mechanism 210 like the one described above with reference to FIG. 3.

At block 602, a first node $204_1$ in the network 202 of nodes initiates a finality proposal on a subject block 214 of the blockchain. The initiating may occur while the first node $204_1$ is generating a first block 216 in the blockchain 206.

The initial finality proposal is part of a transaction record 218 that is appended to the first block 216 and includes an identifier of the subject block 214 and a measures $p_1$. The measures $p_1$ is based on the number of blocks 208 within the blockchain 206 that were mined by the first node $204_1$.

At block 604, a second node $204_2$ in the network 202 of nodes processes the initial finality proposal. This processing may occur while the second node $204_2$ is generating a second block 220 in the blockchain. To this end, the second node $204_2$ first validates the initial finality proposal.

At block 606, assuming the initial finality proposal is validated, the second node $204_2$ continues to process the initial finality proposal by comparing a value based on the measure $p_1$ included in the proposal to a finality criterion. If the criterion in satisfied, the process proceeds to block 608 where the second node $204_2$ determines that the subject block 214 is a finalized block.

Returning to block 606, if the criterion is not satisfied, the process proceeds to block 610, where the second node $204_2$ transmits a subsequent finality proposal for the first block 214. The subsequent finality proposal is part of a transaction record 222 that is generated by the second node $204_2$ and appended to the third block 220 and includes the identifier of the first block 214, the measure $p_1$ from the initial finality proposal, and an additional measure $p_2$ that is based on the number of blocks 208 within the blockchain 206 that were mined by the second node $204_2$.

At block 612, another node $204_3$ in the network 202 of nodes receives the subsequent finality proposal while appending the transaction record 222 to the blockchain 206. The other node $204_3$ repeats the processing of blocks 604, 606, 608 and 610. This processing may occur while the other node is generating another block 224 in the blockchain 206. More specifically, at block 604 the other node $204_3$ validates the subsequent finality proposal. At block 606, the other node $204_3$ compares a value based on the measures included in the proposal to the finality criterion. At block 608, the other node $204_3$ determines that the subject block 214 is a finalized block if the criterion is satisfied. At block 610, if the criterion is not satisfied, the other node $204_3$ transmits another subsequent finality proposal for the first block 214. This subsequent finality proposal is part of a transaction record that is generated by the other node $204_2$ and appended to the another block in the blockchain and includes the identifier of the first block 214, the measure from the subsequent finality proposal that it just processed and an additional measure that is based on the number of blocks 208 within the blockchain 206 that were mined by the other node $204_3$.

The foregoing processing of subsequent finality proposals may be repeated by one or more other nodes 204 until the finality criterion is satisfied and the subject block 214 is finalized.

In this disclosure software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, a smart card, a flash memory device (e.g., card, stick, key drive), random access memory (RAM), read only memory (ROM), programmable ROM (PROM), erasable PROM (EPROM), electrically erasable PROM (EEPROM), a general register, or any other suitable non-transitory medium for storing software.

The various aspects of this disclosure are provided to enable one of ordinary skill in the art to practice the present invention. Various modifications to exemplary embodiments presented throughout this disclosure will be readily apparent to those skilled in the art. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. No claim element is to be construed under the provisions of 35 U.S.C. § 112, sixth paragraph, unless the element is expressly recited using the phrase "means for" or, in the case of a method claim, the element is recited using the phrase "step for."

What is claimed is:

1. A method of determining a finality of a subject block within a blockchain mined by a network of nodes, the method being executed by a processing node and comprising:

receiving a finality proposal for the subject block, the finality proposal including an identifier of the subject block and one or more measures, wherein each of the one or more measures is based on the number of blocks within the blockchain that were mined by a respective node within the network of nodes other than the processing node;

determining the subject block is a finalized block when a value based on the one or more measures satisfies a finality criterion; and transmitting a subsequent finality proposal for the subject block when the value fails to satisfy the finality criterion, wherein the subsequent finality proposal include the identifier of the subject block, the one or more measures from the finality proposal, and an additional measure based on the number of blocks within the blockchain that were mined by the processing node, wherein each of the one or more measures and the additional measure, corresponds to a weight $p_i$ determined as follows:

$$p_i = \frac{\text{(number of blocks mined by node } i\text{)}}{\text{(total number of blocks mined in window } W\text{)}}$$

where,
node i=the respective node or the processing node,
W=all or a portion of the blockchain defined by the number of blocks in the blockchain.

2. The method of claim 1, wherein the finality proposal is received from one of the respective nodes within the network of nodes.

3. The method of claim 1, wherein the finality proposal is included in a transaction record of a block in the blockchain that is subsequent to the subject block, together with a transaction.

4. The method of claim 3, wherein the block is subsequent to the subject block by at least a finality window k corresponding to a number of blocks.

5. The method of claim 3, further comprising, validating the finality proposal prior to determining or transmitting.

6. The method of claim 3, wherein the transaction record further includes a transaction, and further comprising validating the transaction prior to determining or transmitting.

7. The method of claim 1, wherein a respective node, for which a measure is included in the finality proposal, corresponds to a node within the network of nodes that has previously executed at least one of the receiving, determining, and transmitting.

8. The method of claim 1, wherein:
the value based on the one or more measures corresponds to a summation of the one or more measures included in the finality proposal,
the finality criterion corresponds to a threshold value, and
the finality criterion is satisfied when the value is equal to or greater than the threshold value.

9. The method of claim 1, wherein transmitting the subsequent finality proposal comprises including the subsequent finality proposal in a transaction record of a block to be appended to the blockchain by each of the other nodes in the network of nodes.

10. An apparatus for determining a finality of a subject block within a blockchain mined by a network of nodes, the apparatus comprising:
a memory; and
a processor coupled to the memory and configured to:
receive a finality proposal for the subject block, the finality proposal including an identifier of the subject block and one or more measures, wherein each of the one or more measures is based on the number of blocks within the blockchain that were mined by a respective node within the network of nodes other than the apparatus;
determine the subject block is a finalized block when a value based on the one or more measures satisfies a finality criterion; and
transmit a subsequent finality proposal for the subject block when the value fails to satisfy the finality criterion, wherein the subsequent finality proposal include the identifier of the subject block, the one or more measures from the finality proposal, and an additional measure based on the number of blocks within the blockchain that were mined by the apparatus, wherein each of the one or more measures and the additional measure, corresponds to a weight $p_i$ determined as follows:

$$p_i = \frac{\text{(number of blocks mined by node } i\text{)}}{\text{(total number of blocks mined in window } W\text{)}}$$

where,
node i=the respective node or the processing node,
W=all or a portion of the blockchain defined by the number of blocks in the blockchain.

11. The apparatus of claim 10 wherein the finality proposal is received from one of the respective nodes within the network of nodes.

12. The apparatus of claim 10, wherein the finality proposal is included in a transaction record of a block in the blockchain that is subsequent to the subject block, together with a transaction.

13. The apparatus of claim 12, wherein the block is subsequent to the subject block by at least a finality window k corresponding to a number of blocks.

14. The apparatus of claim 12, wherein the processor is further configured to validate the finality proposal prior to determining or transmitting.

15. The apparatus of claim 12, wherein the transaction record further includes a transaction, and the processor is further configured to validate the transaction prior to determining or transmitting.

16. The apparatus of claim 10, wherein: the value based on the one or more measures corresponds to a summation of the one or more measures included in the finality proposal, the finality criterion corresponds to a threshold value, and the finality criterion is satisfied when the value is equal to or greater than the threshold value.

17. The apparatus of claim 10, wherein the processor transmits the subsequent finality proposal by being further configured to include the subsequent finality proposal in a transaction record of a block to be appended to the blockchain by each of the other nodes in the network of nodes.

* * * * *